US011491965B2

(12) United States Patent
Liu

(10) Patent No.: US 11,491,965 B2
(45) Date of Patent: Nov. 8, 2022

(54) OIL-INJECTION DEVICE

(71) Applicant: Cosda Manufacturing Company, Taichung (TW)

(72) Inventor: Lai-Cheng Liu, Taichung (TW)

(73) Assignee: COSDA MANUFACTURING COMPANY, Taichung (TW)

(*) Notice: Subject to any disclaimer, the term of this patent is extended or adjusted under 35 U.S.C. 154(b) by 364 days.

(21) Appl. No.: 16/832,193

(22) Filed: Mar. 27, 2020

(65) Prior Publication Data

US 2021/0300315 A1 Sep. 30, 2021

(51) Int. Cl.
*B60T 17/22* (2006.01)
*B65D 45/02* (2006.01)
*B65D 47/06* (2006.01)

(52) U.S. Cl.
CPC .......... *B60T 17/222* (2013.01); *B65D 45/02* (2013.01); *B65D 47/06* (2013.01)

(58) Field of Classification Search
CPC .................................................. B60T 17/222
USPC ........................................................ 141/363
See application file for complete search history.

(56) References Cited

U.S. PATENT DOCUMENTS

| | | | | |
|---|---|---|---|---|
| 1,154,269 A * | 9/1915 | Penna | ...................... | B67D 7/54 |
| | | | | 141/345 |
| 1,324,206 A * | 12/1919 | Nickell | ......................... | 222/509 |
| 2,241,188 A * | 5/1941 | Burns | ..................... | B60T 11/26 |
| | | | | 222/88 |
| 2,318,717 A * | 5/1943 | Rose | ...................... | B05B 7/2429 |
| | | | | 239/326 |
| 2,735,601 A * | 2/1956 | Barrett | ..................... | B60T 11/22 |
| | | | | 141/285 |
| 3,059,671 A * | 10/1962 | Kings | ....................... | F15B 1/26 |
| | | | | 141/330 |
| 3,709,526 A * | 1/1973 | Cromie | ................... | F16L 31/00 |
| | | | | 285/73 |
| 4,717,048 A * | 1/1988 | Stenger | ................ | B67D 1/0832 |
| | | | | 137/320 |
| 4,986,322 A * | 1/1991 | Chibret | .............. | B65D 81/3211 |
| | | | | 141/366 |
| 6,298,961 B1 * | 10/2001 | Hageman | ................ | B60T 11/26 |
| | | | | 220/721 |
| 11,103,641 B1 * | 8/2021 | Doubet | .................. | A61J 1/2096 |
| 2005/0109421 A1 * | 5/2005 | Mitchell | ............... | B60T 17/222 |
| | | | | 141/59 |
| 2010/0089494 A1 * | 4/2010 | Brady | ................... | B65B 39/007 |
| | | | | 141/2 |
| 2016/0235229 A1 * | 8/2016 | Löhn | ....................... | B65D 47/06 |
| 2017/0203887 A1 * | 7/2017 | Hegdahl | ................ | B05B 7/2408 |
| 2018/0224039 A1 * | 8/2018 | Search | ............... | B65D 41/0428 |

(Continued)

FOREIGN PATENT DOCUMENTS

| | | |
|---|---|---|
| TW | M489114 U | 11/2014 |
| TW | I494236 B | 8/2015 |

(Continued)

*Primary Examiner* — Paul R Durand
*Assistant Examiner* — Michael J. Melaragno
(74) *Attorney, Agent, or Firm* — Muncy, Geissler, Olds & Lowe, P.C.

(57) ABSTRACT

An oil-injection device includes a base body, two clamping members, and a fastening member. The base body is formed with an oil channel. The two clamping members are movably disposed on the base body. The fastening member is movably disposed on the base body.

9 Claims, 6 Drawing Sheets

(56) References Cited

U.S. PATENT DOCUMENTS

2020/0031328 A1* 1/2020 Hill ...................... B60T 17/043
2021/0300315 A1* 9/2021 Liu ...................... B60T 17/222

FOREIGN PATENT DOCUMENTS

| TW | I560133 B | 12/2016 | |
|----|-----------|---------|---|
| WO | WO-2009016364 A1 * | 2/2009 | ............ B60T 17/222 |
| WO | WO-2012032254 A1 * | 3/2012 | ............ B60T 17/222 |
| WO | WO-2016153840 A1 * | 9/2016 | ................ A61J 1/10 |
| WO | WO-2017194419 A1 * | 11/2017 | .............. F16L 23/04 |

* cited by examiner

OIL-INJECTION DEVICE

BACKGROUND OF THE INVENTION

Field of the Invention

The present invention relates to an oil change device, more especially to an oil-injection device.

Description of the Prior Art

Hydraulic brake is most common in vehicles. Heat generated by the brake system may cause the deterioration of the brake oil, so the brake oil has to be changed to maintain the function of braking. Normally, two people are necessary during changing the brake oil. One steps on or releases the brake pedal, and one removes the brake oil to make the new brake oil flow into the oil bottle, as shown in patent TW I560133. However, this method cannot be operated by one person. To solve the problem, the device shown in patent TW I494236 is invented.

However, the device mentioned above has too many elements, is difficult to assemble, and costs too much. A new method that the brake oil is changed by high pressure gas is invented, as shown in patent TW M489114.

The device of TW M489114 needs more space during operating, and the elements around the oil bottle make it difficult to operate. Besides, the bottle openings of different oil bottles are different in size. Devices in different sizes are necessary.

SUMMARY OF THE INVENTION

The main object of the present invention is to provide an oil-injection device which is able to be installed on bottle openings of various oil bottle in order to inject oil into the oil bottle.

To achieve the above and other objects, the oil-injection device of the present invention is for being disposed on an oil bottle. The oil bottle has a bottle opening and a surrounding wall enclosing the bottle opening. The oil-injection device includes a base body, two clamping members, and a fastening member.

The base body is for covering the bottle opening and is formed with an oil channel. The oil channel is adapted for communicating an interior of the oil bottle. The two clamping members are for clamping the surrounding wall and are disposed on the base body openably with respect to the oil channel. The fastening member is movably disposed on the base body and is for fastening and engaging the two clamping members.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
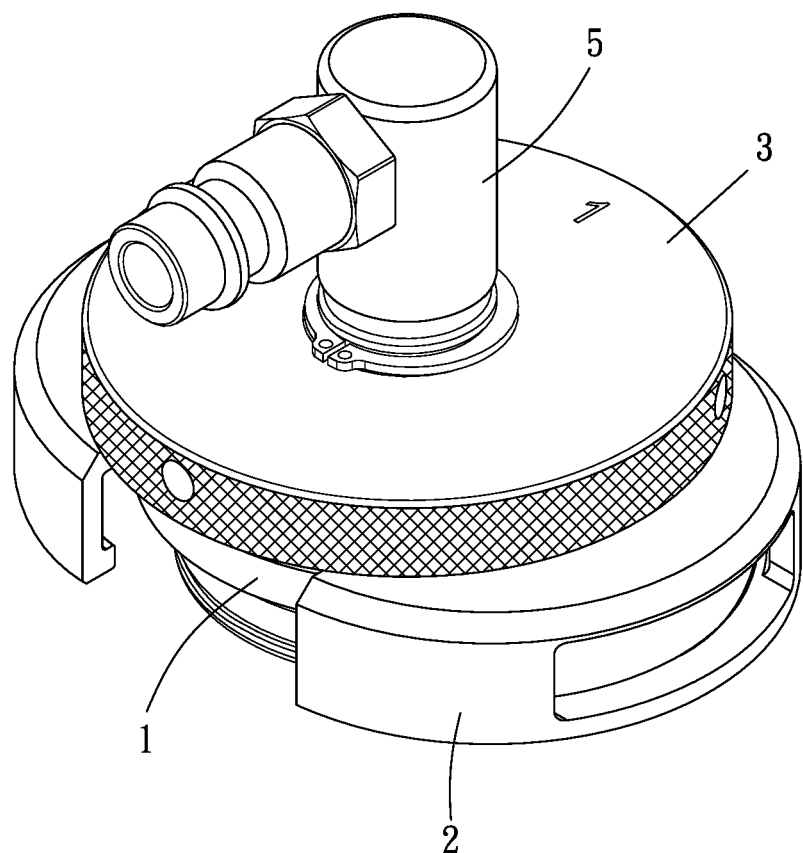
FIG. 1 is a stereogram of the present invention.
Figure 2:
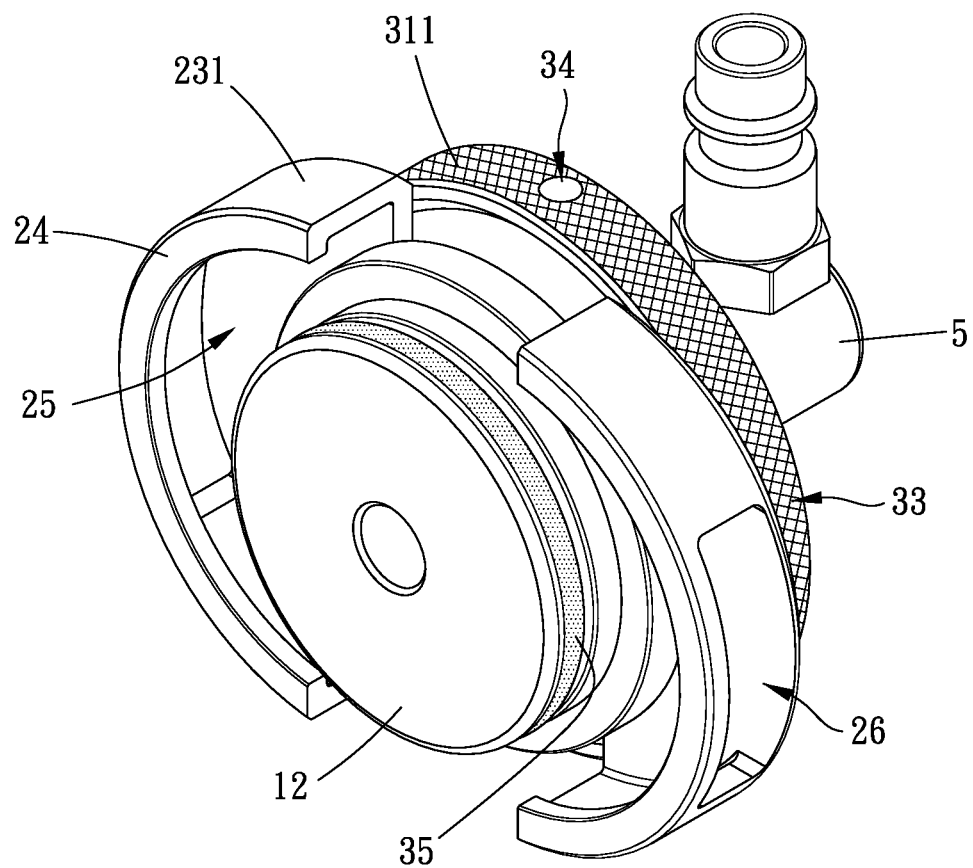
FIG. 2 is a stereogram of the present invention at an other angle.
Figure 3:
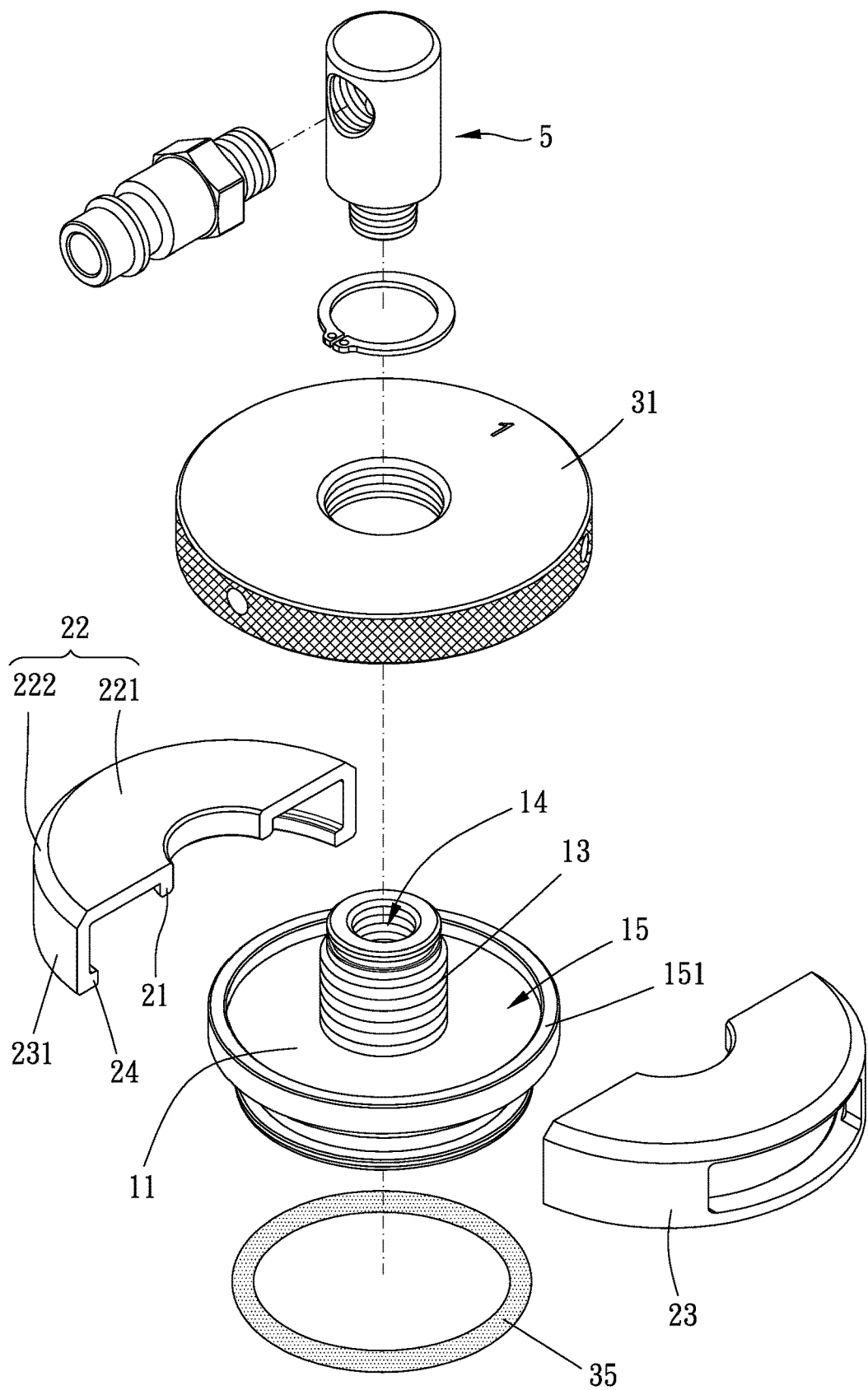
FIG. 3 is a breakdown drawing of the present invention.
Figure 4:
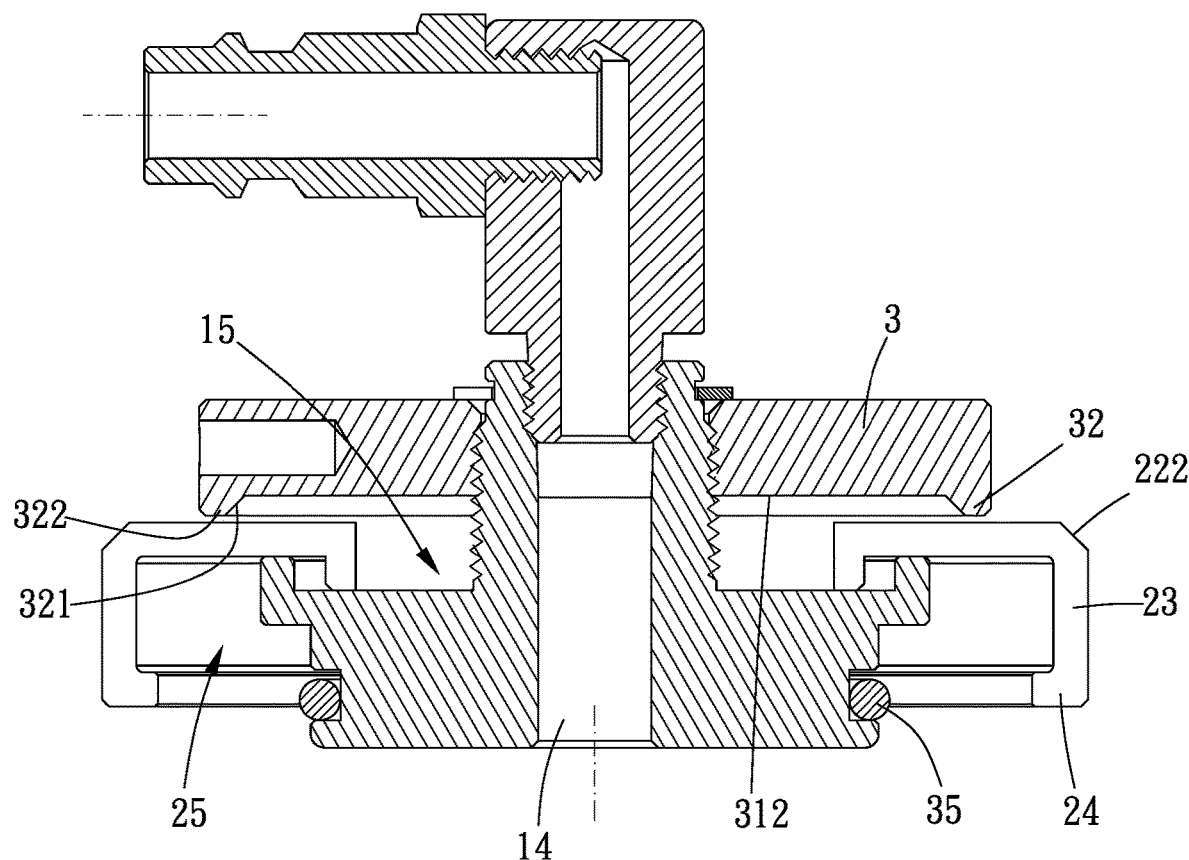
FIG. 4 is a profile of the present invention.
Figure 5:
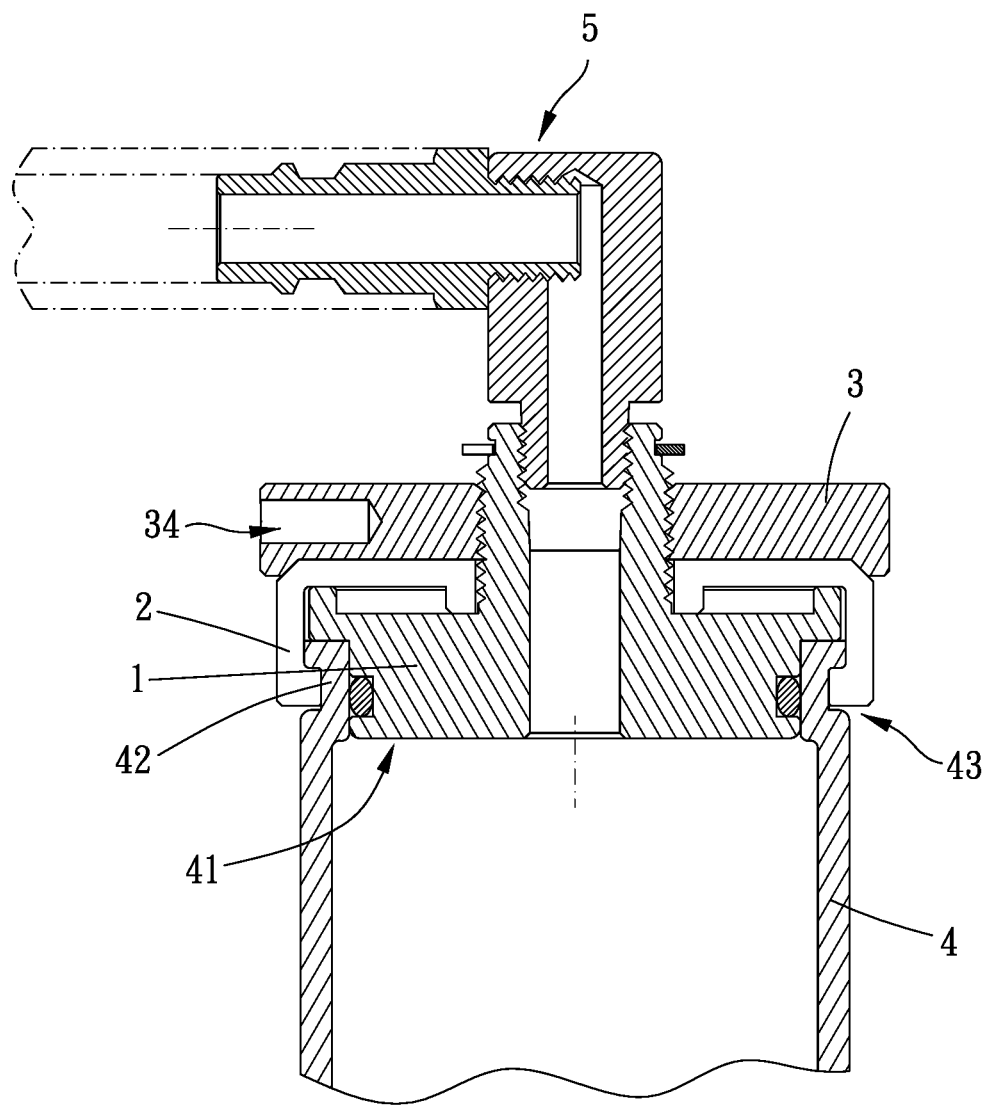
FIG. 5 and FIG. 6 are illustrations of the present invention.

Please refer to FIG. 1 to FIG. 6, the oil-injection device of the present invention is for being disposed on an oil bottle 4. The oil bottle 4 has a bottle opening 41 and a surrounding wall 42 enclosing the bottle opening 41. The oil-injection device includes a base body 1, two clamping members 2, and a fastening member 3.

The base body 1 is for covering the bottle opening 41 and is formed with an oil channel 14. The oil channel 14 is adapted for communicating an interior of the oil bottle 4. When changing oil, new oil such as brake oil is driven by high pressure gas to flow into the oil bottle 4 via the oil channel 14. The two clamping members 2 are for clamping the surrounding wall 42 and are disposed on the base body 1 openably with respect to the oil channel 14 in order to adjust according to the size of the bottle opening 41. The fastening member 3 is movably disposed on the base body 1 and is for fastening and engaging the two clamping members 2.

Specifically, the base body 1 includes a base plate 11, a sealing portion 12, and an extension portion 13. The sealing portion 12 and the extension portion 13 are arranged at two opposite sides of the base plate 11. The oil channel 14 penetrates the base plate 11 and the sealing portion 12 along the extension portion 13. The extension portion 13 is adapted for a connector 5 to connect to communicate the oil channel 14. The fastening member 3 is movably screwed with the extension portion 13. The two clamping members 2 are openable with respect to the extension portion 13 and arranged between the fastening member 3 and the base plate 11. The sealing portion 12 is adapted for sealing the bottle opening 41. In addition, along a direction perpendicular to an extending direction of the extension portion 13, a size of the base plate 11 is larger than a size of the sealing portion 12. Thus, the base plate 11 can cover the bottle opening 41 to enhance the engagement.

More specifically, the base body 1 is formed with a track 15. Each of the clamping members 2 has a sliding portion 21, a supporting portion 22, and a clamping portion 23 connected together. The sliding portion 21 is slidably disposed on the track 15. A part of the supporting portion 22 is located between the fastening member 3 and the base body 1. The clamping portion 23 is adapted for abutting against the surrounding wall 42 laterally. When the fastening member 3 approaches the base body 1 to a locking position, the supporting portion 22 is clamped by the fastening member 3 and the base body 1 so that the clamping member 2 is fixed.

In the present embodiment, the sliding portion 21 and the clamping portion 23 are spacedly arranged on a same side of the supporting portion 22 to form a receiving space 25 which is open. When the sliding portion 21 is slidably disposed on the track 15, a stopping wall 151 of the track 15 is inserted into the receiving space 25 to enhance the engagement. Besides, a side of the supporting portion 22 opposite to the fastening member 3 slidably abuts against the stopping wall 151, and the sliding portion 21 slidably abuts against the bottom of the track 15. Thereby, the contact area between the clamping member 2 and the base body 1 is increased so as to improve the stability of the clamping portion 23 during sliding with respect to the base body 1, and the stability of clamping by the fastening member 3 and the base body 1. On the other hand, along the extending direction of the extension portion 13, the size of the sliding portion 21 is smaller than half the size of the clamping portion 23 so that the sliding portion 21 can insert into the track 15 easily. In addition, the volume of the track 15 is reduced so that the structure strength is enhanced.

Preferably, each of the clamping members 2 is movable along the radial direction of the base body 1, and is also movable along the circumferential direction of the base body 1. In use, the distance between the two clamping members 2 can be adjusted according to the size of the bottle opening, and the positions of the clamping members 2 can be adjusted by rotating to dodge the elements beside the bottle opening 41. In the present embodiment, the track 15 is recessedly formed on the base plate 11 around the extension portion 13. Along the width direction of the track 15, the size of the sliding portion 21 is smaller than half the width of the track 15. Thereby, the clamping member 2 can move along both the radial direction and circumferential direction.

Besides, at least one of the clamping members 2 is formed with an opening 26 communicating the receiving space 25. Thereby, the user can observe the position and the situation of the clamping members 2 via the opening 26.

The fastening member 3 includes a main body 31 and a protruding portion 32. The protruding portion 32 is located at a side of the main body 31 facing the two clamping members 2. The protruding portion 32 is adapted for abutting against the two clamping members 2. The protruding portion 32 is ring-shaped and is located at the periphery of the fastening member 3. Thus, the pressure is exerted onto the two clamping members 2 evenly so that the clamping members 2 can clamp the surrounding wall 42 firmly.

In the present embodiment, the fastening member 3 is circular plate-shaped. An anti-slip structure is arranged on an outer peripheral face 311 of the main body 31 to make it easier to hold the fastening member 3 for rotation. Besides, the fastening member 3 is formed with at least one connecting hole 34. The at least one connecting hole 34 is adapted for a hand tool to connect to increase the arm of force.

Preferably, the protruding portion 32 has a first inclined guiding face 321, and the supporting portion 22 has a support face 221 and a second inclined guiding face 222 at a side thereof facing the fastening member 3. The second inclined guiding face 222 extends obliquely and connects the support face 221 and an outer wall 231 of the clamping portion 23 therebetween. When the two clamping members 2 approach each other to a clamping position and the fastening member 3 is moved to the locking position, the first inclined guiding face 321 abuts against and clamps the second inclined guiding faces 222 of the clamping members 2. The vertical force and the lateral force help the two clamping members 2 clamp the surrounding wall 42 firmly. Besides, the first inclined guiding face 321 and the second inclined guiding face 222 are both oblique, so they may touch each other no matter what size the bottle opening 41 is.

Figure 6:
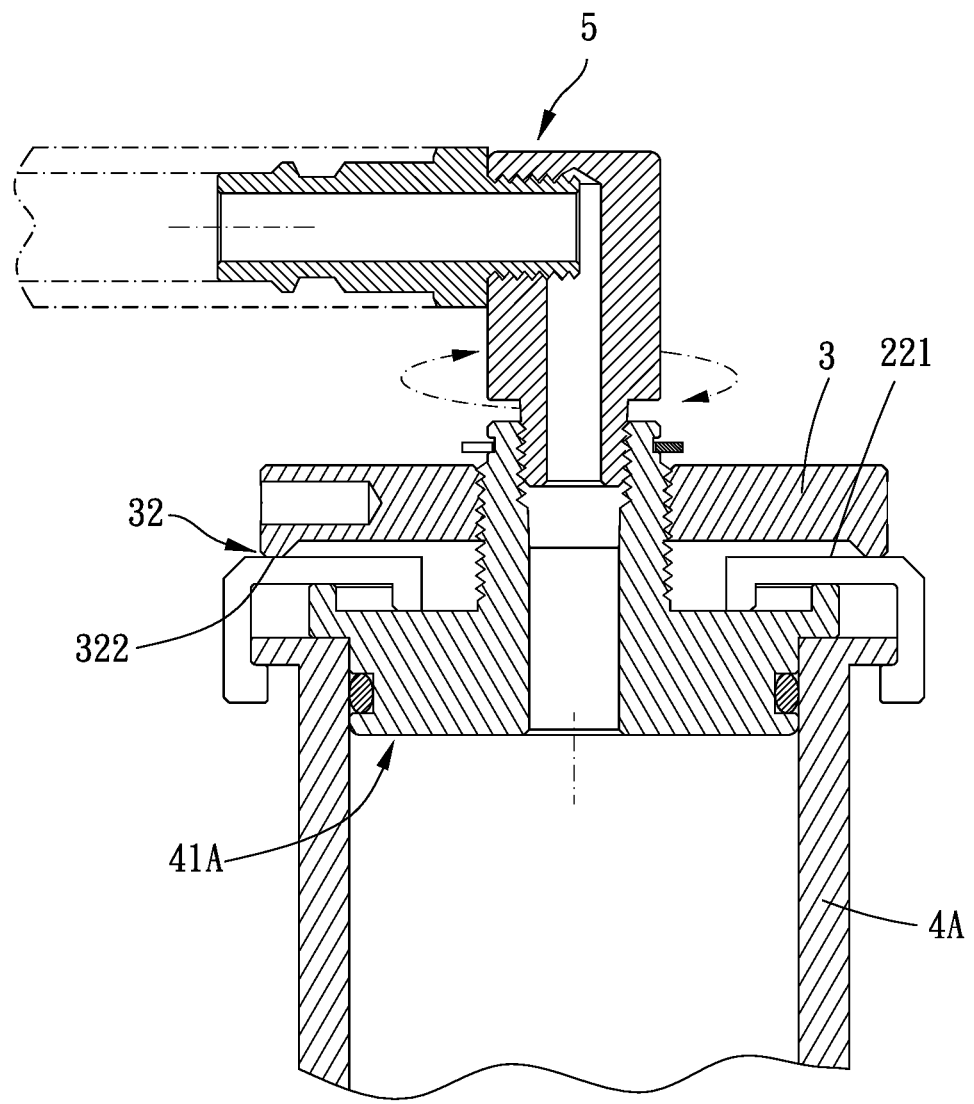

Preferably, the protruding portion 32 further includes an abutting face 322. The abutting face 322, the support face 221, and a bottom face 312 of the main body 31 are parallel arranged. The first inclined guiding face 321 extends obliquely and connects the abutting face 322 and the bottom face 312 of the main body 31. When the two clamping members 2 are located at the clamping position and the fastening member 3 is located at the locking position, the bottom face 312 of the main body abuts against the support face 221 to increase the contact area between the fastening member 3 and the two clamping members 2 to increase the friction. Besides, as shown in FIG. 6, when the oil bottle 4A has a larger bottle opening 41A, the distance between the two clamping members 2 is larger, so the abutting face 322 can abut against the support face 221 directly.

Practically, the surrounding wall 42 of the bottle opening 41 usually has a recessed neck portion 43. The clamping member 2 further has a coupling portion 24. The coupling portion 24 is disposed on the clamping portion 23 spacedly from the supporting portion 22. The coupling portion 24 is adapted for embedding into the neck portion 43 to enhance the engagement. Besides, a sealing ring 35 is sleeved onto the sealing portion 12 for sealing better. The sealing ring 35 is preferably located at the extending direction of the coupling portion 24. When the device is not under using, the coupling portion 24 is near the sealing ring 35 to block other elements outside.

In conclusion, the oil-injection device of the present invention can be used in oil bottles in various sizes. In addition, the space for operating is small, and the operation may not be hindered by the elements beside the oil bottle. Besides, when the clamping members are located at the clamping position and are fastened by the fastening member, the first inclined guiding face abuts against the second inclined guiding face to provide a vertical force and a lateral force to clamp the surrounding wall of the bottle opening firmly.

What is claimed is:

1. An oil-injection device, for being disposed on an oil bottle, the oil bottle having a bottle opening and a surrounding wall enclosing the bottle opening, the oil-injection device including:
   a base body, for covering the bottle opening, being formed with an oil channel, the oil channel being adapted for communicating an interior of the oil bottle; two clamping members, for clamping the surrounding wall, being disposed on the base body openably with respect to the oil channel;
   a fastening member, movably disposed on the base body, for fastening and engaging the two clamping members;
   wherein the base body is formed with a track, each of the clamping members has a sliding portion, a supporting portion, and a clamping portion connected together, the sliding portion is slidably disposed on the track, a part of the supporting portion is located between the fastening member and the base body, the clamping portion is adapted for abutting against the surrounding wall laterally; when the fastening member approaches the base body to a locking position, the supporting portion is clamped by the fastening member and the base body so that the clamping member is fixed.

2. The oil-injection device of claim 1, wherein the sliding portion and the clamping portion are spacedly arranged at a same side of the supporting portion to form a receiving space which is open; when the sliding portion is slidably disposed on the track, a stopping wall of the track is inserted into the receiving space.

3. The oil-injection device of claim 2, wherein the fastening member includes a main body and a protruding portion connected together, the protruding portion is located at a side of the main body facing the two clamping members, the protruding portion is adapted for abutting against the two clamping members.

4. The oil-injection device of claim 3, wherein the protruding portion includes a first inclined guiding face, the supporting portion includes a support face and a second inclined guiding face at a side thereof facing the fastening member, the second inclined guiding face obliquely extends to connect the support face and an outer wall of the clamping portion therebetween; when the two clamping members approach each other to a clamping position and the fastening member is moved to the locking position, the second inclined guiding faces of the two clamping members are clamped by the first inclined guiding face.

5. The oil-injection device of claim 4, wherein a recessed neck portion is formed on the surrounding wall of the bottle opening, the clamping member further includes a coupling portion, the coupling portion is formed on the clamping portion spacedly from the supporting portion, the coupling portion is adapted for embedding in the neck portion; at least one of the clamping members further includes an opening communicating the receiving space; the base body includes a base plate, a sealing portion, and an extension portion, the sealing portion and the extension portion are arranged at two opposite sides of the base plate, the oil channel penetrates the base plate and the sealing portion along the extension portion, the extension portion is adapted for a connector to connect to communicate the oil channel, the fastening member is movably screwed with the extension portion, the two clamping members are openable with respect to the extension portion and arranged between the fastening member and the base plate, the sealing portion is adapted for sealing the bottle opening; the track is annular around the extension portion and is recessedly formed on the base plate; along a width direction of the track, a size of the sliding portion is smaller than half a width of the track; along a direction perpendicular to the extension portion, a size of the base plate is larger than a size of the sealing portion; along the extension portion, the size of the sliding portion is smaller than half a size of the clamping portion; the protruding portion further includes an abutting face, the abutting face, the support face, and a bottom face of the main body are parallel arranged, the first inclined guiding face extends obliquely and connects the abutting face and the bottom face of the main body therebetween; when the two clamping members are at the clamping position and the fastening member is at the locking position, the bottom face of the main body abuts against the support face; a sealing ring is sleeved onto the sealing portion, the sealing ring is located at an extension direction of the coupling portion; the fastening member is circular and plate-shaped, an anti-slip structure is disposed on an outer peripheral face of the main body of the fastening member; the fastening member is formed with at least one connecting hole for a hand tool to connect; a side of the supporting portion opposite to the fastening member slidably abuts against the stopping wall, the sliding portion slidably abuts against a bottom of the track; the protruding portion is annular and is located at a periphery of the fastening member.

6. The oil-injection device of claim 1, wherein a recessed neck portion is formed on the surrounding wall of the bottle opening, the clamping member further includes a coupling portion, the coupling portion is formed on the clamping portion spacedly from the supporting portion, the coupling portion is adapted for embedding in the neck portion.

7. The oil-injection device of claim 2, wherein at least one of the clamping members further includes an opening communicating the receiving space.

8. The oil-injection device of claim 1, wherein each of the clamping members is movable along a radial direction of the base body and is also movable along a circumferential direction of the base body.

9. An oil-injection, for being disposed on an oil bottle, the oil bottle having a bottle opening and a surrounding wall enclosing the bottle opening, the oil-injection device including:
    a base body, for covering the bottle opening, being formed with an oil channel, the oil channel being adapted for communicating an interior of the oil bottle;
    two clamping members, for clamping the surrounding wall, being disposed on the base body openably with respect to the oil channel;
    a fastening member, movably disposed on the base body, for fastening and engaging the two clamping members;
    wherein the base body includes a base plate, a sealing portion, and an extension portion, the sealing portion and the extension portion are arranged at two opposite sides of the base plate, the oil channel penetrates the base plate and the sealing portion along the extension portion, the extension portion is adapted for a connector to connect to communicate the oil channel, the fastening member is movably screwed with the extension portion, the two clamping members are openable with respect to the extension portion and arranged between the fastening member and the base plate, the sealing portion is adapted for sealing the bottle opening.

* * * * *